Nov. 27, 1923
V. M. FOWLER
DIRECTION INDICATOR
Filed April 18, 1922
1,475,293
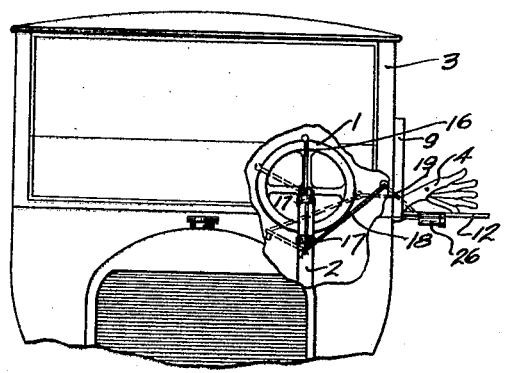
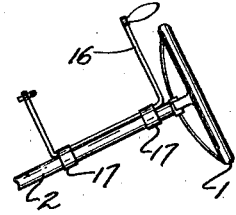
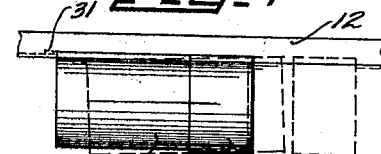
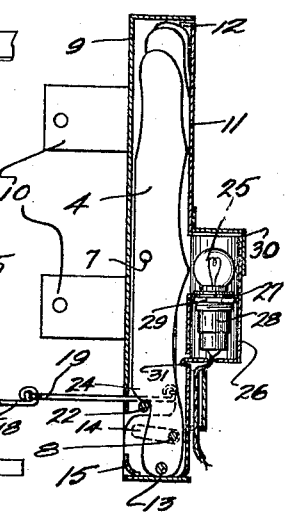
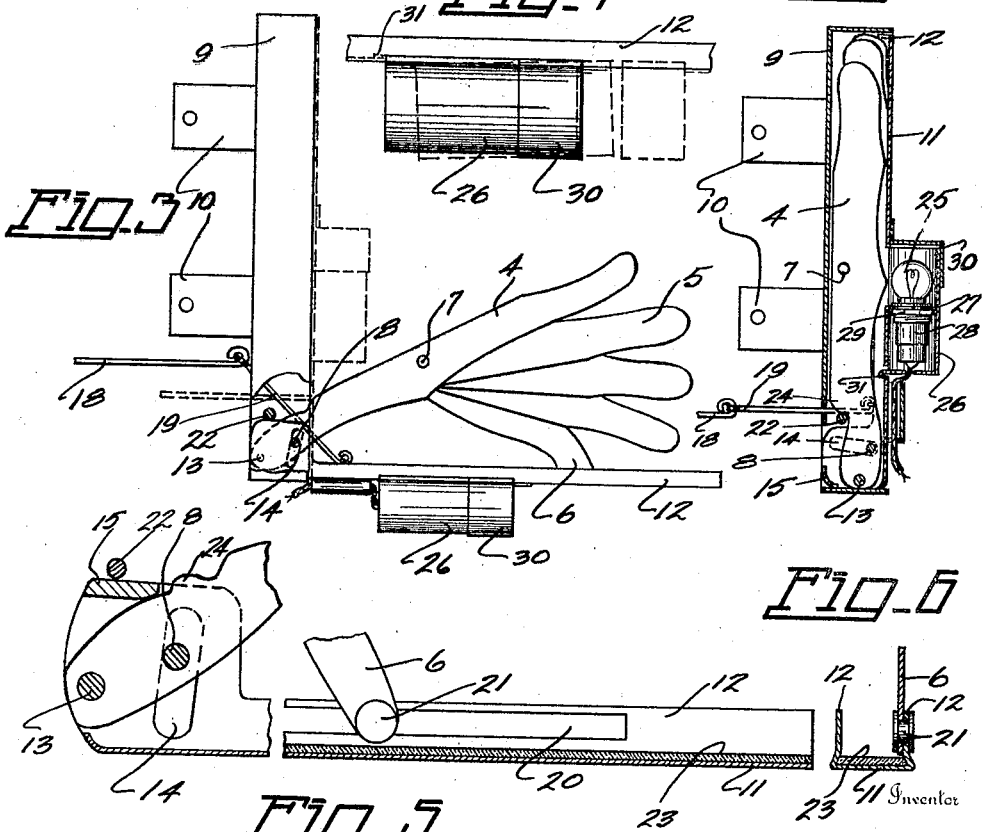
Inventor
Victor M. Fowler
By Herbert E. Smith
Attorney Patented Nov. 27, 1923.

1,475,293

UNITED STATES PATENT OFFICE.

VICTOR M. FOWLER, OF SPOKANE, WASHINGTON.

DIRECTION INDICATOR.

Application filed April 18, 1922. Serial No. 554,731.

*To all whom it may concern:*

Be it known that I, VICTOR M. FOWLER, a citizen of the United States, residing at Spokane, in Spokane County and State of Washington, have invented certain new and useful Improvements in Direction Indicators, of which the following is a specification.

My present invention relates to improvements in direction indicators for use in connection with automobiles and automotive vehicles, and is designed for use either with closed cars or open type of cars. When used with a closed car the indicator is usually mounted on or within the door frame, and when adapted for use with open cars may be supported from the windshield, or other convenient accessory. In either event the indicator, in the form of a hand, is provided with means for illumination at night effective when the indicator is moved to operative position. The indicator is of the folding type embodying in its construction members or pivoted blades simulating the fingers of a hand, and is actuated by manually operated means under control of the driver, located for convenience adjacent to the steering wheel of the automobile.

The invention consists in certain novel combinations and arrangements of parts as will be hereinafter more specifically set forth and pointed out in the appended claims.

In the accompanying drawings I have illustrated one complete example of the physical embodiment of my invention in which the parts are combined and arranged according to the best mode I have thus far devised for the practical application of the principles of my invention.

Figure 1 is a view showing so much of a closed automobile as is necessary to illustrate the application thereto of my invention, the indicator being shown in operative position or extended.

Figure 2 is a detail view showing the manual control for the device supported on the steering wheel post.

Figure 3 is an enlarged detail view of the device, detached, with the indicator in extended or unfolded operative position.

Figure 4 is a vertical sectional view through the housing with the indicator retracted in inoperative position, and showing also the relation thereto of the illuminating lamp.

Figure 5 is an enlarged detail, sectional view of the closure for the housing, which closure forms the lever for actuating the foldable indicator.

Figure 6 is a transverse vertical sectional view of the lever showing the sliding connection of a lever arm thereto.

Figure 7 is a detail view showing the attachment of the electric lamp to the lever or closure.

For convenience of illustration and description I have shown the steering wheel and post, as 1 and 2, and indicated a portion of the body of the closed automobile as 3, to which parts the subject matter of the invention may with facility be conveniently attached.

The indicator, as shown is made to simulate a hand, and is shown as comprising a comparatively long blade or base member 4, three fingers as 5, and a fourth finger as 6, the fingers or blades 5 and 6 being pivoted on a pin 7 passing through the main blade 4. The main blade is pivoted at 8 on a pin which passes transversely through and is fixed within the upright housing 9 for the indicator.

The housing 9 is preferably of metal, rectangular in shape, and is fashioned with attaching flanges 10 by means of which it is secured in rigid position to the automobile frame or to a windshield as desired. At one side the house or housing is open, through which the fingers of the indicating hand may pass when the indicator is operated, but in normal position, as in Figure 4, the members of the hand, including the main blade 4, are encased within the housing.

A closure for the housing is provided by the swinging arm 11, which is of metal, and as shown in Figure 6 has side flanges 12 that fit within the open face of the housing when the device is in closed position. This closure device forms a lever, for operating the indicator, which is pivoted on the pin 8, and is also pivoted at 13 to the main blade 4. At its pivoted end the lever is fashioned with a box or inclosure having slots 14 in its sides to permit relative movement of the lever and main blade as they swing on the common pivot 8, and a cross bar 15 joins the two slotted sides of the lever box, as seen in Figure 5, to act as an abutment for the main blade 4 and limit outward opening movement of the indicator.

The lever is caused to swing outwardly and downwardly on its pivot 8 through manually controlled actuating means including a hand lever 16 in the form of a crank, which is pivoted, as in collars 17 on the steering post 2. A connecting rod 18 and link 19 connect the crank lever and lever 11 as shown, and it will be apparent that by turning the hand lever 16 the indicator may be swung on its pivot as desired. As the indicator is swung to operative position, it is extended and the fingers opened, through the slide connection of the lever arm 6 with the lever 11. In Figures 5 and 6 it will be seen that one of the side flanges 12 of the lever 11 is slotted as at 20, and a roller 21 on the lever arm has a rolling action along the walls of this slot as the lever swings on its pivot 8. The outward swing of the lever 11 is limited by contact of the bridge or bar 15 with a fixed pin 22 passed through the housing, and in position to intercept the lever-box as the lever swings outwardly.

An anti-rattling device or cushion 23, for the blades or fingers of the foldable indicator may be used as a lining in the closure or lever 11 in order to prevent noise and to cushion the movement of the folding blades of the indicator as they swing to closed position on their pivots 7 and 8.

For daytime use it will be apparent that the indicator may be turned down to horizontal position as indicated in Figure 3 by turning the crank handle 16 of Figure 2, and the link 19, which when the device is in retracted position assumes the horizontal position indicated in Figure 4, forces the lever or closure 11 to swing out and down on its pivot 8, carrying with it the hand. The main blade 4 swings with the lever, until its pivoted inner end, which is provided with a shoulder 24, encounters the bridge bar 15. The main blade is now held stationary, while the lever, because of its slot 14 is permitted to have an additional movement relative to the stationary main blade. This additional movement, through the link finger or blade 6, causes the intermediate blades 5 to swing on their pivot 7 in the main blade, thus opening the fingers of the hand to position in Figure 3. A turn of the crank handle 16 in the opposite direction will cause the lever to swing up toward the housing, closing the blades within the lever and housing, and thus retracting the indicator.

For illuminating the indicator, as at night, an electric lamp 25 is employed and provided with usual electrical connections and control switch. The lamp is carried in a lamp casing 26 in the form of a cylinder located at the underside of the lever, and the lever is slotted as seen in Figure 4 to permit the light rays passing through the lever or closure, when the latter is opened, for illuminating the indicator. Within the casing, and attached to the closure or lever 11 is a supporting bracket 27 for the lamp socket 28 and a clamp nut 29 secures the lamp and socket in the bracket. The casing encloses the lamp and socket, as well as the bracket, and a removable cover 30 is provided for the casing. The casing is connected with the closure or lever by attaching lugs 31 engaged in slots of the lever, and the casing and cover are removable, as indicated in dotted lines Figure 7 to give access to the lamp for renewal or adjustment. The lamp may be equipped with connections whereby it is illumined only when the indicator is swung to open position, and automatically extinguished when the indicator is swung to closed position. By enclosing the lamp in its casing the light rays of the illuminated lamp shine only on the extended indicator thus clearly displaying the indicator at night and rendering the indicator visible to the driver of a succeeding vehicle, or to others for usual purposes.

Having thus fully described my invention, what I claim is—

1. The combination in a foldable indicator with an open housing, of a slotted closure device having a pivotal connection at the lower end of said housing, a main blade bodily movable with said closure device and pivoted thereto, intermediate blades pivoted on said main blade, one of said intermediate blades having a sliding pivotal connection with the closure device, means for limiting the movement of the main blade with relation to the closure device, and means for limiting the swinging movement of the closure device.

2. The combination in a foldable indicator with an open housing, of a closure formed with slots in its sides and fashioned with slotted side flanges providing a box-like structure, a pivot pin at the lower end of the housing passed through said slots in the sides of the closure, means for actuating the closure, a main blade fixed on said pin and pivoted in the closure, intermediate blades pivoted on the main blade, and one of said blades having a pivoted sliding connection with the slotted side flanges of the closure.

In testimony whereof I affix my signature.

VICTOR M. FOWLER.